INVENTOR.
HERBERT D. TANZMAN
BY
ATTORNEY

United States Patent Office 3,530,377
Patented Sept. 22, 1970

3,530,377
TEST MEANS FOR DETERMINING THE FREQUENCY STABILITY OF PIEZOELECTRIC CRYSTALS
Herbert D. Tanzman, Elberon, N.J., assignor to Winslow Tele-Tronics, Inc., Asbury Park, N.J., a corporation of Pennsylvania
Filed May 22, 1968, Ser. No. 731,061
Int. Cl. G01r 29/22
U.S. Cl. 324—56
6 Claims

ABSTRACT OF THE DISCLOSURE

A circuit for analyzing the performance of piezoelectric crystals within an extended temperature range. The oscillating activity and the frequency stability are measured at temperatures from −55° C. to +105° C. The crystal, with two electrodes, is mounted in an enclosed chamber and either heated by an electric resistance heater or cooled by the discharge of liquid carbon dioxide. Variations in generated frequencies and oscillator activity are measured for each of a number of temperature increments.

BACKGROUND OF THE INVENTION

This invention relates to a circuit means for detecting and measuring the beat frequency produced by a piezoelectric crystal coupled to a precision frequency standard. The circuit means also measures the current flowing through the crystal. Measurements are made during a temperature run between any predetermined temperatures produced by an electric heater and by the injection of liquid carbon dioxide in a heat insulated enclosure.

Prior test means have included heat insulated enclosures, but only for more narrow temperature ranges. The present insulated enclosure is good for hot testing up to 105° C. and for cold testing down to −55° C., all in the same mounting. Neither the circuit nor the crystal under test are rearranged for a complete temperature test run.

The temperatures can be adjusted by switching means external of the enclosure and the results of each test are displayed by means of signal lamps indicating a pass or fail condition of the piezoelectric crystal under test. Adjustments are provided for presetting the frequency and current limits of the crystal under test. Since the apparatus is easily adjustable for any complete temperature range, a crystal can be tested in only a few minutes and its pass or failure characteristics noted as they occur.

A feature of the present invention is the use of a controlled flow of carbon dioxide liquid from a pressurized container into a compartment in the heat insulated enclosure.

Another feature of the invention is the provision for externally recording both the beat frequency and the crystal current plotted against the temperature of the crystal under test. A switch for extending the low to high temperature run is provided so that the test results may be recorded more closely in time as they occur.

Another feature of the invention is an acceptance test indicator. The circuit can be set for any predetermined test ranges. As long as the crystals tested fall within the range, green lamps are lighted. When the crystals are not within the ranges, red lamps are lighted.

For a better understanding of the present invention, together with the other details and features thereof, reference is made to the following description taken in connection with the accompanying drawings.

DESCRIPTION OF THE PREFERRED EMBODIMENT

Figure 1:
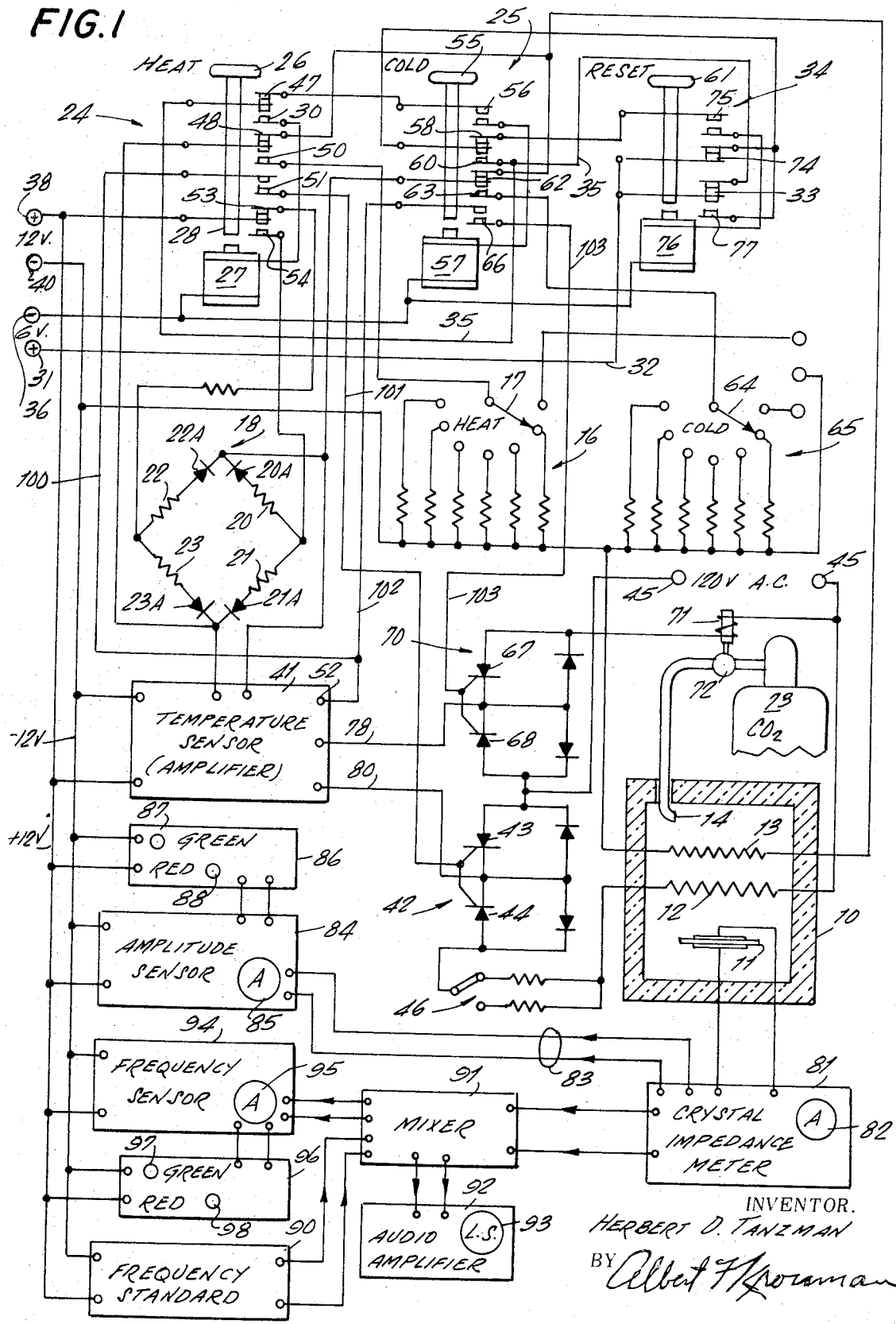
FIG. 1 is a schematic diagram of connections of the entire test circuit showing the switching units, the heat insulated enclosure, and many of the measuring circuits in block.

Referring now to FIG. 1, the test equipment includes a heat insulated container 10 in which are mounted the crystal 11 under test, an electric heater 12 and a thermistor 13. A discharge nozzle 14 is mounted near one wall for applying carbon dioxide liquid to the chamber.

The thermistor 13 aids in regulating the temperature of the chamber to a predetermined value and, for this reason, it is connected to a four-armed bridge circuit. Since the temperature is adjusted over a wide range of values and since the heating and cooling controls are different, two bridges are used and manually operated switching means are employed to change from the hot range to the cold range. When the heater 12 is used to raise the temperature of the chamber 10, a series of resistors 16 are switched into the circuit by a dial switch 17. These resistors 16 form a second arm of the temperature regulating bridge 18 (see FIG. 2). The other two arms of bridge 18 during the heating measurements are resistors 20 and 21, shown in their bridge connection in FIG. 2. Since the thermistor 13 varies considerably in resistance value during the hot and cold test runs, it has been found necessary to switch the third and fourth bridge arms for these two conditions. To save switching contacts, the two arms 20 and 21 are connected in parallel with arms 22 and 23, employed in the cold test runs, and to prevent current deviation, four diodes 20A, 21A, and 22A, and 23A are connected as shown.

Switching from hot to cold test conditions is done by manually operating switch arrays 24 and 25. The heat switching means includes a manually operable button 26, a relay type winding 27 for latching the contacts into their operating position, and an armature 28 for retention by the winding. When the button 26 is depressed, a pair of locking contacts 30 are closed and current then flows from a positive terminal 31 of a six volt direct current source, over conductor 32, through closed contacts 33 of a reset switch array 34, then over conductors 35, through closed contacts 30 and winding 27, to the negative terminal 36 of the six volt power supply. The six volt power supply is used only to operate the switching circuits and the latching windings.

The bridge circuit 18 has two opposite junction points connected to a second direct current source of power 37 (shown in FIG. 2) connected to terminals 38 and 40. The other two junction points of bridge 18 are connected to an amplifier circuit 41 which amplifies the unbalance condition of the bridge and applies a resultant voltage to a semiconductor switching circuit 42 including two diodes and two silicon controlled rectifiers (SCR's) 43 and 44. The switching circuit 42 is connected in series between terminals 45, the heater 12 in compartment 10, and an adjustable resistor 46. Alternating current power of 120 volts is connected to terminals 45 and whenever the bridge is unbalanced due to variations of the thermistor 13, current is applied to heater 12 and the temperature inside chamber 10 is raised.

When button 26 is depressed, several other contacts are operated in order to complete a circuit for regulating the hot temperatures in compartment 10. A pair of contacts 47 is opened, thereby preventing the cold switching array 25 from being latched into its operating position.

A normally closed contact 48 is opened and a normally open pair 50 is closed, thereby switching the thermistor to another arm of the bridge. The third contact pair 51 is normally open and closure of these contacts connects one of the output terminals 52 of the temperature sensing circuit 41 to the firing electrodes of the SCR's 43, 44 in switch 42. The fourth pair of contacts is operated to open contacts 53 and close contacts 54, thereby shifting the positive terminal 38 from the junction of resistors 22 and 23 to the opposite junction of resistors 20 and 21.

When test runs are to be made at temperatures less than room temperature, button 55 in switch array 25 is depressed. This action closes locking contacts 56 which complete a circuit through a latching winding 57, the six volt source, conductor 32, contacts 33 on the reset switch 34, over conductors 35, through contacts 47 in the HEAT switch 24, and back to locking contacts 56. Depression of button 55 also opens contacts 58 and closes contacts 60, this action switching the positive six volt supply line through contacts 33, so that actuation of the RESET button 61 will break the locking circuit. Contacts 62 are opened and contacts 63 are closed by button 55, thereby switching the upper junction point of diodes 20A and 22A from one side of thermistor 13 to a dial switch arm 64 in a COLD array of resistors. The fourth set of normally open contacts 66, when closed, connects terminal 52 on the temperature sensor 41 to the firing electrodes of two silicon controlled rectifiers (SCR's) 67 and 68. These rectifiers are part of a switching circuit 70 which controls alternating current power for controlling a solenoid 71 to open a valve 72 and deliver carbon dioxide gas from a tank 73 through nozzle 14.

The RESET switch 34 is for normalizing the switching means when a test run has been completed. Depressing button 61 opens locking contacts 33 and 74 and closes locking contacts 75. Contacts 33 and 74 are connected to the positive terminal 31 of the six volt supply and when they are opened, either the HEAT switch 24 or the COLD switch 25 is normalized because their locking circuits are broken. The RESET switch 34 is locked into its depressed condition by a circuit which can be traced from the negative terminal 36 of the six volt supply through winding 76, locking contacts 75, contacts 58 on the COLD switch, closed contacts 77 on the RESET switch 34, and back to terminal 31 of the six volt supply.

The output of the bridge which includes the thermistor 13 as one arm is connected to an amplifier circuit 41 and the output from this circuit is connected to switch circuits 42 or 70, depending whether the HEAT or COLD switch button is depressed. The amplifier circuit 41 may deliver the switching pulses over two conductors 78 and 80 or these two conductors may be connected together and grounded.

The crystal 11 is connected to a crystal impedance meter 81 with circuits and components for generating high frequency waves controlled by the crystal. The circuit also includes an indicating meter 82 which is connected in the oscillating circuit and gives a reading responsive to the amplitude of the oscillating current. All the circuits in the crystal impedance meter 81 are well known in the art and have been described in books and journals. The output of meter circuit 81 is applied to a shielded cable 83 connected to an amplitude sensor circuit 84 which includes a meter 85 and a variable voltage divider for applying a predetermined portion of the oscillator output to an indicating circuit 86 containing a green "pass" lamp 87 and a red "fail" lamp 88. Circuit details of this component will be discussed later in connection with FIG. 2.

Circuits 84 and 86 are for testing the amplitude output of the crystal when used as an oscillator and produce data responsive to the crystal internal impedance. The remainder of the test circuits are for determining the frequency of the crystal and its frequency stability as the temperature is changed. A frequency standard oscillating circuit 90 containing an accurately calibrated crystal is employed for generating a predetermined frequency equal to the specified frequency desired of the test crystal 11. Output conductors from the impedance circuit 81 and the frequency standard 90 are applied to a mixer circuit 91 where the two frequencies are combined and then rectified to produce a beat frequency which is equal to the difference between the standard frequency and the frequency generated by the test crystal 11. The beat frequency which is always in the audible range is applied to an audio amplifier 92 including a loud speaker 93. The loud speaker provides instant and continued aural information regarding the frequency deviations of the test crystal 11.

Figure 2:
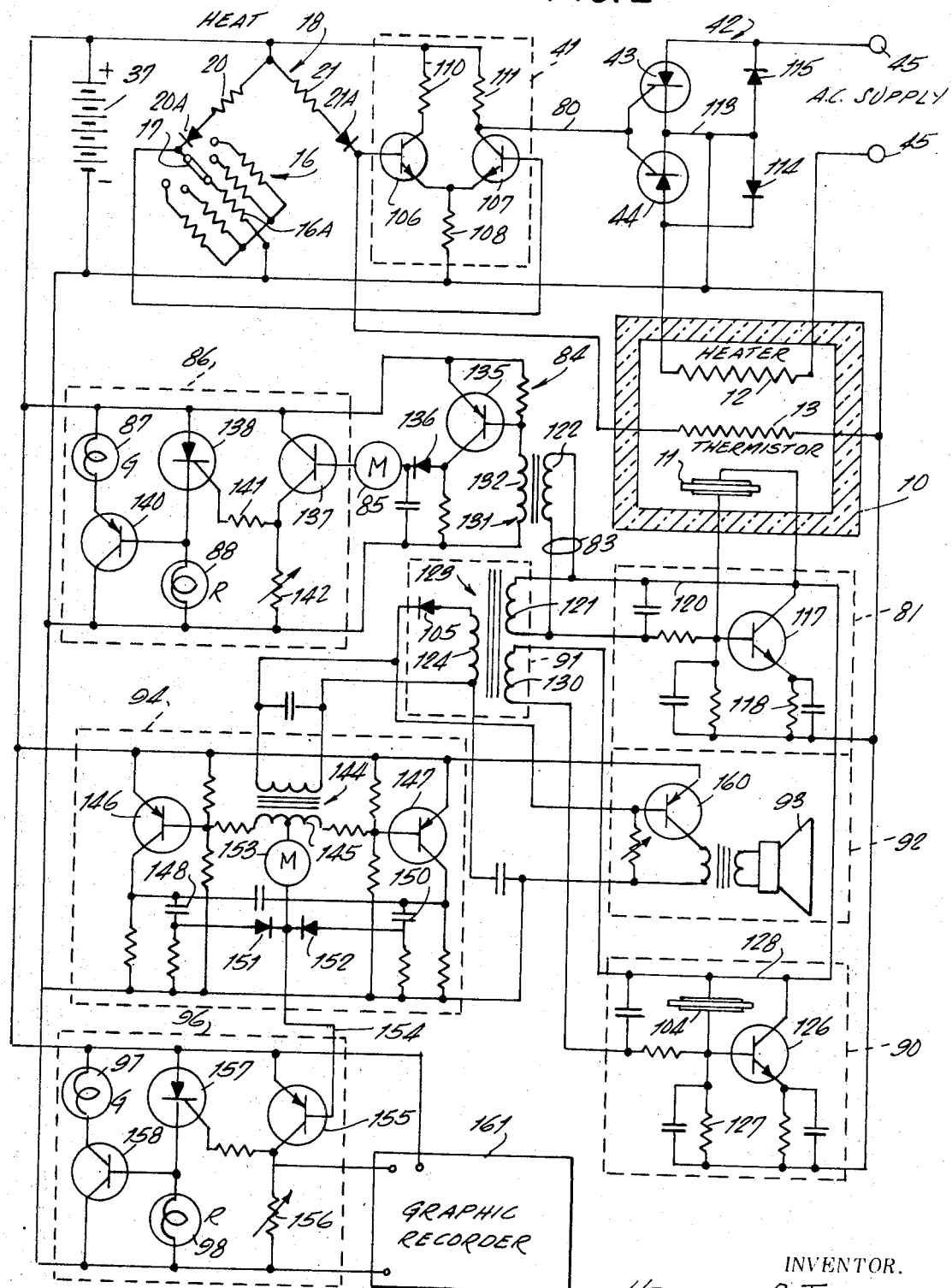
FIG. 2 is also a schematic diagram of connections, without many of the switching units, showing only the heater control, but showing many of the details of the measuring circuits.

In order to measure the frequency deviations and determine when the test crystal is within the predetermined specifications, a portion of the beat frequency is applied to frequency sensor 94. This circuit may be constructed in many ways, a simple filter being sufficient for most applications. FIG. 2 shows a more accurate frequency circuit in which the frequency response is linear. A meter 95 can be calibrated to indicate the number of cycles per second in the beat frequency.

The output of circuit 94 is applied to a "pass" or "fail" circuit 96 including a green "pass" lamp 97 and a red "fail" lamp 98. This circuit is the same as circuit 86.

The operation of the circuit shown in FIG. 1 is obvious from the above description. For a test at any temperature within the available range, the dial switch 17 or 64 is adjusted to the temperature indicated. If the temperature is above room temperature, the HEAT button 26 is depressed and the contacts under the button switch the HEAT resistor 16 into the bridge circuit with thermistor 13 and resistors 20 and 21 as the other three bridge arms. The unbalance bridge voltage is sensed and amplified by circuit 41 and a voltage is applied from terminal 52, conductor 100, contacts 51, and conductor 101, to the firing electrodes of SCR's 43 and 44 causing them to conduct and send heater current through heater 12 in compartment 10 to heat the crystal. The temperature is sensed by thermistor 13 and when the desired temperature is produced, the bridge is balanced and the test results are available. For a production run of many crystals, the operator may only note the indicator lamps in circuits 86 and 96. For more detailed information, the readings of meters 82, 85, and 95 are noted.

If the desired temperature is lower than room temperature, the COLD button 55 is depressed and dial switch 64 is set at the desired test temperature. This time the bridge circuit includes arms 22, 23, thermistor 13, and one of the resistors in group 65. During the unbalance time, a voltage is sent from terminal 52, over conductor 102, contacts 66, and conductor 103 to the firing electrodes of SCR's 67 and 68 to make bridge circuit 70 conductive and send alternating current through solenoid 71. This opens valve 72 and pipes liquid carbon dioxide through nozzle 14 to cool the crystal 11 in compartment 10. When the bridge 18 is balanced valve 72 closes, the crystal is at the desired temperature and the tests may be made as described above.

The circuit diagram shown in FIG. 2 gives circuit details of some of the components which may be used to test crystals. The three switching units 24, 25, and 34 have been omitted for the sake of clarity and only the components employed during the heating tests are shown. It should be noted that, while the described circuits of FIG. 2 can produce the desired test results, other similar circuits can be substituted.

In order to use the same battery 37 for both the bridge 18 and the amplifier 41, a differential type circuit is employed. Two transistors 106 and 107 having a common emitter resistor 108 and separate collector resistors 110 and 111 have their bases connected to opposite bridge junctions for detecting and amplifying the bridge unbalance voltages. The output of amplifier 41 is taken from the collector of transistor 107 and applied directly to the firing electrodes of controlled rectifies 43 and 44.

When this circuit is put into operation, the operator moves the dial switch 17 to a resistor 16A, representing a desired hot temperature. After a sufficient time for temperature stabilization, the sensing circuits are turned on and the crystal is measured for amplitude and frequency deviation. During the time the heater 12 is heating the space within compartment 10, the unbalanced bridge sends a voltage over conductor 80 to the two silicon controlled rectifies 43 and 44, causing them to conduct. During one half cycle when rectifier 43 receives a positive wave, current flows through this rectifier, then across conductor 113 and through diode 114 to heater 12 and the other supply terminal 45. During the other half of the cycle, current flows through the heater 12, then through rectifier 44, and then through diode 115 to the other supply terminal. This current heats the space within the compartment 10 and raises the temperature until thermistor 13 increases in resistance to a value which balances the bridge. At this point there is no output through conductor 80 and the alternating current is shut off.

The crystal oscillator circuit 81 includes a transistor 117, a bias resistor 118 and a feedback connection 120 between the collector and base electrodes of the transistor. This feedback circuit is connected in series with two primary windings 121 and 122 of a tank circuit which supplies current to an output transformer 123 having a secondary winding 124. The standard frequency oscillator 90 may have a similar circuit which includes a piezoelectric crystal 104, a transistor 126, a bias circuit 127, a feedback connector 128, and an output winding 130 on the core of mixing transformer 123. The standard crystal 104 may be placed in a temperature regulated compartment (not shown).

The mixing circuit includes the transformer 123 and a diode rectifier 105 connected in series with output winding 124. The rectifier 105 demodulates the mixed oscillations from circuits 81 and 90 and produces a frequency wave equal to the difference between the two generated frequency sensor circuit 94.

In order to determine the amplitude of the oscillations produced by the test crystal 11, the output circuit is connected to a primary winding 122 on transformer 131. The secondary winding 132 is coupled to an amplifying transistor 135 and a rectifying diode 136. The output of the amplifying stage is connected in series with a current meter 85 which is responsive to the crystal current. The circuit 84 is also connected to the "pass" or "fail" circuit 86 which includes a transistor 137 having its collector electrode connected to a controlled rectifier 138 and a variable resistor 142. Current through the variable resistor creates a voltage which is applied to the firing electrode of the rectifier and makes it conductive to send current from the positive terminal of the battery, through the rectifier 138, and then through the red lamp 88, lighting it to indicate a "fail" condition. Current through this circuit raises the potential of the base of transistor 140 and makes it nonconductive, thereby eliminating the operation of the green lamp 87. Since the red lamp 88 should be lighted only when the current from circuit 81 is below a predetermined value, the transistor 135 is arranged to invert the signal so that, when no signal is sent over conductors 83, a large voltage appears across resistor 142 and, when a suitable signal is transmitted, the voltage across resistor is low and the controlled rectifier remains non-conductive. This condition maintains the potential of the base of transistor 140 at zero and the transistor conducts, lighting the green lamp 87.

The frequency sensor circuit 94 shown in FIG. 2 is one of a number of circuits which produce a meter reading proportional to the applied frequency. The beat frequency is applied to an input transformer 144 having a center tap secondary winding 145. The alternations produced by the secondary winding are applied to the base electrodes of transistors 146 and 147, making them conductive and non-conductive alternately each cycle. Each time the transistors are made conductive, a charging pulse is sent to capacitors 148 and 150 charging them to a predetermined voltage. The charge leaks off through rectifier diodes 151 and 152 providing current for meter 153 and sending a voltage pulse over conductor 154 to the base electrode of transistor 155 in the "pass" or "fail" circuit 96. Transistor 155 amplifies the input voltage and sends a current through a variable resistor 156. As long as the voltage across resistor 156 is less than a predetermined value, the controlled rectifier 157 remains non-conductive, the base of transistor 158 is at a conductive potential and the green lamp 97 is lighted. When the beat frequency is greater than a specified limit, the voltage across resistor 156 is sufficient to fire the controlled rectifier, the green lamp 97 is deprived of current and the red lamp 98 is lighted.

The beat frequency is generally within the audible range and to assist the operator in rapidly determining the frequency stability, a loud speaker 93 is added to the test circuit. Power for this circuit is derived from secondary winding 124 in the mixer 91. The winding 124 in series with diode 105 is connected to the base electrode of transistor 160, the collector electrode of this component being coupled to the voice coil of the speaker unit 93.

If it is desired to obtain a permanent record of the performance of any test crystal, a graphic recorder 161 may be connected as indicated.

Having thus fully described the invention, what is claimed as new and desired to be secured by Letters Patent of the United States, is:

1. Testing equipment for determining the frequency stability of piezoelectric crystals comprising:
   (a) a source of direct current power,
   (b) a heat insulated compartment for containing the crystal under test, said compartment including an electric heater for raising the temperature of the crystal, a conduit leading into the compartment for conveying liquid carbon dioxide therein to lower the temperature of the crystal, and a thermistor unit adjacent to the crystal for determining its temperature,
   (c) a four armed bridge circuit including three resistors as three arms and said thermistor as the fourth arm, one pair of opposite bridge junction points connected to said source of direct current power,
   (d) a bridge sensing and control circuit for sensing the unbalance condition of the bridge and for generating a control pulse which operates to change the temperature within said compartment, said bridge circuit including an amplifier having input terminals connected to the other opposite bridge junction points,
   (e) a first control circuit connected in series with a source of alternating current power and the heater adjacent to the test crystal, said control circuit including two semiconductor controlled rectifiers, each having a firing electrode connected to the output circuit of said amplifier for controlling the current through the heater,
   (f) a second control circuit connected in series with a winding on a solenoid valve connected to said conduit in the compartment and a source of alternating electric power, said second control circuit including two semiconductor controlled rectifiers, each having a firing electrode connected to the output circuit of said amplifier for controlling the solenoid valve to open when the temperature within the compartment is to be lowered,
   (g) an oscillating circuit with feedback means connected to the test crystal in the compartment for oscillating it at a frequency determined by the test crystal characteristics,
   (h) a standard frequency oscillator for producing a stabilized reference frequency.
   (i) a mixing and demodulating circuit having input terminals connected to said test oscillating circuit and to said reference frequency oscillator for mixing the two generated frequencies and for producing a beat frequency, (j) and a frequency sensing circuit connected to the mixing and demodulating circuit for indicating the frequency of the beat frequency.

2. Testing equipment as claimed in claim 1 wherein said four-armed bridge includes one arm having an adjustable resistor for varying the desired temperature in the compartment.

3. Testing equipment as claimed in claim 1 wherein the amplifier connected to the bridge is a differential amplifier including two transistors each having a base electrode connected respectively to the amplifier input terminals and having one of the transistor collector electrodes connected to said control circuit.

4. Testing equipment as claimed in claim 1 wherein switching means are provided for switching from a cooling test circuit to a heating test circuit, said switching means for substituting the solenoid winding and its control circuit for the electric heater and its control circuit, said switching means including an electromagnetic winding and an armature coupled to a plurality of switching contacts for retaining the switching means in a latched condition.

5. Testing equipment as claimed in claim 1 wherein a pass or fail circuit is connected to the frequency sensing circuit, said pass or fail circuit including lamp indicating means operated by the mixing and demodulatng circuit for indicating a pass or fail condition.

6. Testing equipment as claimed in claim 1 wherein a loud speaker is coupled to the mixing and demodulating circuit for producing an audible tone having a frequency equal to the difference in frequencies produced by the two oscillators.

References Cited

UNITED STATES PATENTS

| | | | |
|---|---|---|---|
| 2,455,520 | 12/1948 | Prudhon et al. | 324—56 |
| 2,691,111 | 10/1954 | Minnich | 324—56 XR |
| 2,998,575 | 8/1961 | Mason | 310—8.9 XR |
| 3,007,023 | 10/1961 | Johnston et al. | |
| 3,102,183 | 8/1963 | Harrison. | |
| 3,201,621 | 8/1965 | Milner | 310—8.9 |

GERARD R. STRECKER, Primary Examiner

U.S. Cl. X.R.

310—8.9